United States Patent
Cosner et al.

(10) Patent No.: US 11,750,021 B2
(45) Date of Patent: Sep. 5, 2023

(54) MODULAR ELECTRICAL POWER SUBSYSTEM ARCHITECTURE

(71) Applicant: Raytheon Company, Waltham, MA (US)

(72) Inventors: Christopher M. Cosner, Manhattan Beach, CA (US); John F. Stickelmaier, Manhattan Beach, CA (US); John J. Wootan, Hermosa Beach, CA (US)

(73) Assignee: Raytheon Company, Waltham, MA (US)

( * ) Notice: Subject to any disclaimer, the term of this patent is extended or adjusted under 35 U.S.C. 154(b) by 238 days.

(21) Appl. No.: 17/097,622

(22) Filed: Nov. 13, 2020

(65) Prior Publication Data
US 2022/0158477 A1 May 19, 2022

(51) Int. Cl.
*H02J 7/00* (2006.01)
*H02J 7/35* (2006.01)
(Continued)

(52) U.S. Cl.
CPC ............... *H02J 7/35* (2013.01); *B64G 1/425* (2013.01); *B64G 1/428* (2013.01); *B64G 1/443* (2013.01);
(Continued)

(58) Field of Classification Search
CPC .... H02J 7/00; H02J 7/35; H02J 7/0024; H02J 7/0014; H02J 7/007; B64G 1/42;
(Continued)

(56) References Cited

U.S. PATENT DOCUMENTS

| 5,233,351 A | 8/1993 | Gregory et al. |
| 6,229,279 B1 | 5/2001 | Dierker |

(Continued)

FOREIGN PATENT DOCUMENTS

| EP | 0780295 | 6/1997 |
| EP | 0922637 | 6/1999 |

(Continued)

OTHER PUBLICATIONS

International Search Report and Written Opinion dated Jan. 24, 2022 in corresponding International Application No. PCT/US2021/055771.

(Continued)

*Primary Examiner* — Robert Grant
(74) *Attorney, Agent, or Firm* — Renner, Otto, Boisselle, & Sklar

(57) ABSTRACT

An electrical power system has a dual battery configuration that enables sufficient power supply for a spacecraft bus and a payload module being carried by the spacecraft. During a sunlight power mode, power is drawn from a solar array of the bus to power a low-discharge payload of the spacecraft and a high-discharge payload of a payload module. During the sunlight power mode, a low rate discharge battery and a high rate discharge battery are charged by a battery charge management unit of the spacecraft bus. During an eclipse power mode, the low rate discharge battery powers the low-discharge payload of the spacecraft and the high rate discharge battery powers the high-discharge payload of the payload module. The high-rate discharge battery may also be used to power the high-rate discharge payload in the sunlight power mode to meet its high current demands to meet a flexible mission operations.

21 Claims, 5 Drawing Sheets

(51) Int. Cl.
*H02S 40/38* (2014.01)
*B64G 1/42* (2006.01)
*B64G 1/44* (2006.01)
*B64G 1/58* (2006.01)
*H01M 10/42* (2006.01)
*H02S 50/00* (2014.01)

(52) U.S. Cl.
CPC ............ *B64G 1/58* (2013.01); *H01M 10/425* (2013.01); *H02J 7/007* (2013.01); *H02J 7/0014* (2013.01); *H02J 7/0024* (2013.01); *H02J 7/0063* (2013.01); *H02S 40/38* (2014.12); *H02S 50/00* (2013.01); *H01M 2010/4271* (2013.01)

(58) Field of Classification Search
CPC . B64G 1/44; B64G 1/58; B64G 1/428; B64G 1/443; H01M 10/42; H01M 10/425; H02S 50/00; H02S 40/38
USPC ........................................................ 320/117
See application file for complete search history.

(56) References Cited

U.S. PATENT DOCUMENTS

| | | | |
|---|---|---|---|
| 9,368,983 B2 | 6/2016 | Stickelmaier et al. | |
| 2014/0079978 A1* | 3/2014 | Al-Hallaj | H01M 10/6552 429/120 |
| 2015/0037648 A1* | 2/2015 | Nguyen | H01M 10/613 429/120 |
| 2016/0288928 A1 | 10/2016 | Smith et al. | |
| 2016/0290304 A1* | 10/2016 | Yukawa | B60L 1/00 |
| 2017/0054303 A1* | 2/2017 | Choi | H01M 50/296 |
| 2018/0244407 A1* | 8/2018 | Rozman | H02J 9/00 |
| 2019/0092257 A1* | 3/2019 | Boecker | B60R 16/04 |
| 2019/0288351 A1* | 9/2019 | Son | H01M 10/653 |
| 2019/0363406 A1* | 11/2019 | Yamada | H02J 7/00712 |
| 2020/0328487 A1* | 10/2020 | Nayak | H01M 50/20 |
| 2020/0339010 A1* | 10/2020 | Villanueva | H01M 10/625 |
| 2021/0313830 A1* | 10/2021 | Dowler | H02J 1/084 |

FOREIGN PATENT DOCUMENTS

| | | | |
|---|---|---|---|
| EP | 0970884 | 1/2000 | |
| EP | 2014553 | 7/2008 | |
| WO | 1992/00223 | 1/1992 | |
| WO | 2008/136880 | 11/2008 | |
| WO | WO-2021206242 A1 * | 10/2021 | ............ H02J 7/0013 |

OTHER PUBLICATIONS

Minoru Iwasa, et al., "Study of decentralized collaboration power control for spacecraft," (PEDS) IEEE 10th International Conference on, IEE, Apr. 13, 2013, pp. 686-689.

Momoh, J. A., et al., "Spacecraft ring-bus power system management scheme," IEEE Power and Energy Society General Meeting, Jul. 25, 2010, pp. 1-6.

Haines, J. E., et al., "The Power System of ESA's Envisat-1 Mission," Proceedings of the 30th Intersociety Energy Conversion Engeneering Conference, Jul. 30, 1995, pp. 387-392.

* cited by examiner

MODULAR ELECTRICAL POWER SUBSYSTEM ARCHITECTURE

FIELD OF DISCLOSURE

The disclosure relates to spacecraft and more particularly, to an electrical power system or subsystem for spacecraft.

DESCRIPTION OF THE RELATED ART

Spacecraft may be configured to carry payloads, such as communication antennas, receivers, transmitters, etc. Small spacecraft use electrical power subsystems that may be undersized for use with some payloads, such as payloads that have a high peak power, a short duty-cycle, and are configured to have mission utility at any time and at any location in an orbit. For example, the bus of the spacecraft may not anticipate intermittent operation of high powered payloads and may provide power choices and thermal technologies that do not support high discharge currents. Additionally, conventional subsystems may also be deficient in being adaptable with different payload components.

One prior attempt to provide an electrical power subsystem for a spacecraft includes using a self-contained battery without spacecraft monitoring or control. The battery is connected directly to the solar array of the spacecraft bus, such that the system is not modular. Still other deficiencies of the known subsystem may include mission constraints driven by limits on the ability to reject the heat generated by the power subsystem and the inability to source the short-term electrical power to provide increased payload operation as required during a mission.

SUMMARY OF THE DISCLOSURE

The present application provides an electrical power subsystem (EPS) having a dual battery configuration that enables sufficient power supply for a spacecraft bus and a payload module being carried by the spacecraft. Nominally, during a sunlight power mode, power is drawn from the bus's EPS to drive both the low rate-of-discharge equipment and the high-discharge payload of a payload module, while concurrently storing energy in the batteries for use during eclipse. During the sunlight power mode, a low rate discharge battery for the spacecraft bus and a high rate discharge battery for the payload module are charged by a battery charge management unit of the spacecraft bus. During an eclipse power mode of the electrical power system, the low rate discharge battery is configured to power the low discharge equipment of the spacecraft and the high rate discharge battery is configured to power the high-discharge payload of the payload module.

Using the dual battery configuration is advantageous in that the EPS is configured to enable various combinations of charging and discharging the dual battery configuration to allow for optimal operations dependent on mission requirements, due to the batteries being arranged in separate circuits. For example, the high discharge rate battery might be used during the eclipse portion to power the high-discharge payload, and/or during the sunlight portion to provide additional current boost to the high-discharge payload. The batteries can also be sized to accommodate for the power storage and current discharge requirements for a wide variety of payloads of differing natures.

In this disclosure, the high rate of discharge battery is sized to ensure that the cells are configured to both accept a predetermined amount of charge current and supply a predetermined amount of current to operate the load of the corresponding payload independent from the sizing of the low-rate-of discharge battery. Still another advantage of the electrical power system is that the dual battery configuration enables modularity of the system in that the power subsystem for the payload module may be decoupled from the spacecraft bus for parallel integration and testing.

The electrical power system may further include a payload module thermal management system for the payload module that is independent from the spacecraft thermal management system, such that wasted heat that is generated during operation of the high rate discharge battery and associated equipment is accommodated. The thermal management system may include at least one thermal radiator and a heat sink or transient thermal absorber, such as a phase change material.

The high rate discharge battery of the payload module may be managed either by a battery charge management unit of the spacecraft bus or by a secondary battery charge management unit of the payload module that is coupled to a solar array management unit of the bus. Advantageously, if the high rate discharge battery is managed by the secondary battery charge management unit of the payload module, payload module power testing may be performed in parallel with or separately from the spacecraft bus, without connection between physical interfaces of the bus and the payload module.

According to an aspect of the disclosure, an electrical power system for a spacecraft may include a dual battery configuration including a low rate discharge battery and a high rate discharge battery.

According to an aspect of the disclosure, an electrical power system for a spacecraft may include a payload module that is carried by the spacecraft and includes a secondary battery.

According to an aspect of the disclosure, an electrical power system may include a high-discharge battery that is capable of supplying current to a high-discharge payload while still in view of the sun exhibiting the flexibility to meet varying mission operational demands.

According to an aspect of the disclosure, an electrical power system for a spacecraft may include a payload module that is carried by the spacecraft and includes a payload module thermal management system that is independent from a spacecraft thermal management system of the spacecraft bus.

According to an aspect of the disclosure, a method of arranging an electrical power system for a spacecraft may include optimizing a size of the batteries in a dual battery configuration of the electrical power system.

According to an aspect of the disclosure, a method of arranging an electrical power system for a spacecraft may include sizing a low rate discharge battery and a high rate discharge battery to receive a predetermined amount of charge current and supply a predetermined amount of discharge current.

According to an aspect of the disclosure, an electrical power system for a spacecraft includes a bus including a first payload, a solar array, a first battery, and a battery charge management unit coupled between the first battery and the solar array, and a payload module that is carried by the spacecraft, the payload module including a second payload and a second battery that is removably couplable to the battery charge management unit of the bus.

According to an embodiment in accordance with any paragraph(s) of this summary, the electrical power system has a sunlight power mode in which the solar array is operable to power the first payload and the second payload while the first battery and the second battery are charged, and an eclipse power mode in which the first battery is operable to power the first payload and the second battery is operable to power the second payload independently from the bus.

According to an embodiment in accordance with any paragraph(s) of this summary, the second battery is operable to supply current to the second payload when in view of the sun.

According to an embodiment in accordance with any paragraph(s) of this summary, the second battery is configured to discharge current at a higher rate as compared with the first battery.

According to an embodiment in accordance with any paragraph(s) of this summary, the payload module includes a payload module thermal management system that is independent from a spacecraft thermal management system for the bus.

According to an embodiment in accordance with any paragraph(s) of this summary, the payload module thermal management system includes a heat sink.

According to an embodiment in accordance with any paragraph(s) of this summary, the heat sink includes a phase change material.

According to an embodiment in accordance with any paragraph(s) of this summary, each of the payload module thermal management system and the spacecraft thermal management system includes at least one thermal radiator.

According to an embodiment in accordance with any paragraph(s) of this summary, the bus includes a solar array management unit coupled between the solar array and the battery charge management unit.

According to an embodiment in accordance with any paragraph(s) of this summary, the payload module includes a secondary battery charge management unit that is removably couplable to the solar array management unit.

According to an embodiment in accordance with any paragraph(s) of this summary, the payload module is operable for power testing independently from the bus when the payload module is uncoupled from the bus.

According to an embodiment in accordance with any paragraph(s) of this summary, each of the first battery and the second battery are coupled to a corresponding voltage control unit and a corresponding power distribution unit.

According to another aspect of the disclosure, a method of arranging an electrical power system for a spacecraft includes coupling a battery charge management unit between a first battery and a solar array in a bus that includes a first payload, and removably coupling a second battery of a payload module to the battery charge management unit, the payload module being configured to be carried by the spacecraft and including a second payload having a higher current discharge rate as compared with the first payload.

According to an embodiment in accordance with any paragraph(s) of this summary, the method includes arranging a payload module thermal management unit in the payload module independently from a spacecraft thermal management unit of the bus.

According to an embodiment in accordance with any paragraph(s) of this summary, the method includes coupling a solar array management unit between the solar array and the battery charge management unit in the bus, and removably coupling a secondary battery charge management unit of the payload module to the solar array management unit.

According to an embodiment in accordance with any paragraph(s) of this summary, the method includes decoupling the payload module from the bus, and power testing the payload module and the bus independently relative to each other.

According to an embodiment in accordance with any paragraph(s) of this summary, the method includes selecting a size of the solar array to power the first payload and the second payload during a sunlight power mode of the electrical power system.

According to an embodiment in accordance with any paragraph(s) of this summary, the method includes sizing the first battery to be charged during the sunlight power mode and power the first payload during an eclipse power mode, sizing the second battery to be charged during the sunlight power mode and power the second payload during the eclipse power mode, selecting a battery cell type for each of the first battery and the second battery, and sizing the first battery and the second battery based on a minimum storage capacity of the battery cell type for each of the first battery and the second battery.

According to an embodiment in accordance with any paragraph(s) of this summary, the method includes resizing the first battery until the first battery is configured to be charged during the sunlight power mode and power the first payload during the eclipse power mode, or resizing the second battery until the second battery is configured to be charged during the sunlight power mode and power the second payload during the eclipse power mode.

According to an embodiment in accordance with any paragraph(s) of this summary, the method includes ensuring reliability of the electrical power system by one of selecting a number of components to reduce the number of components susceptible to failure, or selecting the number of components to increase the number of components susceptible to failure whereby the reliability of the electrical power system is maintained if one of the number of components is in a failure mode. According to still another aspect of the disclosure, a method of operating a spacecraft using an electrical power system includes powering a low-discharge payload of the spacecraft and a high-discharge payload of a payload module carried by the spacecraft using a solar array during a sunlight power mode, charging a low rate discharge battery of the spacecraft and a high rate discharge battery of the payload module during the sunlight power mode using a battery charge management unit for the spacecraft, powering the low-discharge payload using the low rate discharge battery during an eclipse power mode, powering the high-discharge payload using the high rate discharge battery during the eclipse power mode or in sunlight, and managing thermal characteristics of the payload module using a payload module thermal management system of the payload module that is coupled to the high rate discharge battery and separate from a spacecraft thermal management system for the spacecraft.

To the accomplishment of the foregoing and related ends, the disclosure comprises the features herein after fully described and particularly pointed out in the claims. The following description and the annexed drawings set forth in detail certain illustrative embodiments of the disclosure. These embodiments are indicative, however, of but a few of the various ways in which the principles of the disclosure may be employed. Other objects, advantages and novel features of the disclosure will become apparent from the following detailed description of the disclosure when considered in conjunction with the drawings.

BRIEF DESCRIPTION OF DRAWINGS

The annexed drawings, which are not necessarily to scale, show various aspects of the disclosure.

DETAILED DESCRIPTION

The principles described herein have application in a spacecraft or spacecraft for aerospace deployment, generally outside of the atmosphere of a planet. The disclosure is more particularly directed to a small spacecraft, such as a spacecraft having a mass of 500 kilograms (1,100 pounds) or less. The principles described herein may be suitable for spacecrafts of any size. The spacecraft may be launched in an Earth orbit, such as in a low Earth orbit, by any suitable launch vehicle. In other exemplary applications, the principles described may be suitable for operation in any orbit, such as a high Earth orbit, geosynchronous Earth orbit, or even Deep Space. Any suitable payload may be carried by the spacecraft.

Figure 1:
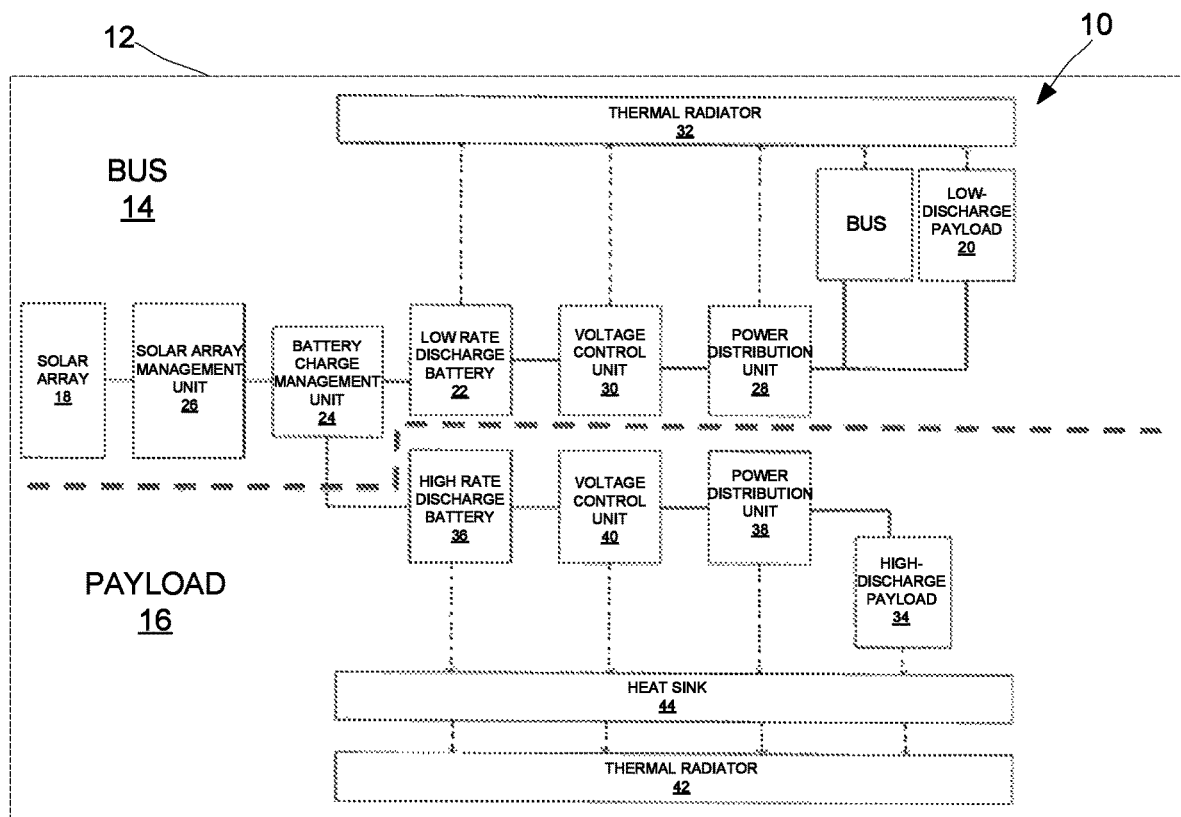
FIG. 1 shows an electrical power system for a spacecraft according to an exemplary embodiment of the present disclosure.

Referring first to FIG. 1, an electrical power system 10 for a spacecraft 12 is shown. The electrical power system 10 is configured to provide electrical power generation, storage, and distribution for the spacecraft 12. The electrical power system 10 includes a bus circuit (or bus) 14 for the spacecraft 12 and a payload module 16 that is configured to be carried by the spacecraft 12. The payload module 16 is configured to share the power supply of the bus circuit 14 for the spacecraft 12.

The payload module 16 may be configured to perform a specific function of the spacecraft 12, such as communication and/or observation. For example, the payload module 16 may include any suitable communication circuitry, such as antennas, receivers, transmitters. The payload module 16 may include any suitable sensors, such as optical or RF sensors for observing the Earth or objects moving around the Earth in an Earth orbit, such as in a Low Earth Orbit. Many other electronics or devices may be arranged in the payload module 16 depending on a mission to be executed by the spacecraft 12. The payload module 16 may be operable independently of the spacecraft 12 and more than one payload module 16 may be provided.

The bus circuit 14 of the spacecraft 12 includes a solar array 18 for power generation for the spacecraft 12. During a sunlight power mode of the electrical power system 10, the bus circuit 14 may act as the main source of power for the spacecraft 12 via the solar array 18 converting energy from the sun to electricity. Any suitable solar array may be used. The solar array 18 may be formed of a plurality of photovoltaic or solar cells, which may be formed of any suitable material, such as silicon or gallium-arsenide. Other solar power generation devices may be used, such as panels, radioisotopes, or thermonuclear power generators.

The bus circuit 14 includes any suitable low-discharge payload 20 and a low rate discharge battery 22. During the sunlight power mode of the electrical power system 10, the low rate discharge battery 22 is charged via a battery charge management unit 24 that is arranged in the bus circuit 14 and coupled to the low rate discharge battery 22. Nominally, when the spacecraft 12 is out of the sunlight region in the orbit, the electrical power system 10 is in an eclipse power mode in which the solar array 18 is inoperable to provide power for the low-discharge payload 20 and the bus circuit 14. Accordingly, the low rate discharge battery 22 is operable during the eclipse power mode to provide power for the low-discharge payload 20. For example, in a 100 minute orbit period, between 30 and 40 minutes of the period may be an eclipse period in which the solar array 18 is inoperable. Alternatively, as will be further described below, mission operations may be optimized by discharging a high rate discharge battery to supply the payload with maximum current during sunlight and therefore, its operation is not isolated to eclipse.

The battery charge management unit 24 is configured to protect the low rate discharge battery 22 from damage, prolong the life of the low rate discharge battery 22, and maintain the low rate discharge battery 22 in a state in which the low rate discharge battery 22 is operable for satisfying the requirements of a particular mission, i.e. to receive a predetermined amount of charge current and supply a predetermined amount of discharge current to meet the demand of the load of the low-discharge payload 20 during the eclipse power mode. For example, the battery charge management unit 24 may be configured to perform cell protection, charge control, state of charge or health determination, cell balancing, monitoring and storing the history of the low rate discharge battery 22, and communication.

The battery charge management unit 24 is also coupled to a solar array management unit 26 that is coupled to the solar array 18 for protecting and controlling operation of the solar array 18. The bus circuit 14 of the spacecraft 12 further includes a power distribution unit 28 for the bus circuit 14. The power distribution unit 28 is configured to control the different power modes for the spacecraft 12 depending on where the spacecraft 12 is located in the orbit, such as the sunlight power mode and the eclipse power mode.

The bus circuit 14 may further include a voltage control unit 30 coupled between the power distribution unit 28 and the low rate discharge battery 22. The voltage control unit 30 is configured to control the amount of voltage for the low rate discharge battery 22. Accordingly, the voltage control unit 30 is configured to ensure that the required voltage and current is provided for the low rate discharge battery 22 such that the low rate discharge battery 22 is able to support the load of the low-discharge payload 20 during the eclipse power mode.

The bus circuit 14 for the spacecraft 12 further includes a spacecraft thermal management system 32 that is configured to maintain an optimal temperature range for the components of the spacecraft 12, e.g. for the bus circuit 14, the low rate discharge battery 22, the voltage control unit 30, the power distribution unit 28, and the low-discharge payload 20. Any suitable components may be used for the spacecraft thermal management system 32, such as at least one thermal radiator. All of the components of the bus circuit 14 may be electrically coupled using any suitable circuitry, electrical connectors, electromechanical interfaces, etc.

The payload module 16 includes a high-discharge payload 34, which is separate from and has a higher discharge current rate as compared with the low-discharge payload 20 of the bus circuit 14, which may include low discharge equipment. Each of the payloads 20, 34 may include more than one payload, and may include any number of payloads as required for a particular mission of the spacecraft 12.

Accordingly, the payload module 16 may have a higher power requirement as compared with the bus circuit 14. For example, in an exemplary application, the payload module 16 may have a voltage that is between 80 and 120 volts as compared with a voltage of the bus circuit 14 that is between 15 and 40 volts.

The payload module 16 includes a second, high rate discharge battery 36 for powering the high-discharge payload 34 and thus the payload module 16 during the eclipse power mode or during a sunlight mode to provide the high current rate that is required by the high-discharge payload 34 and is not available from the bus circuit 14. Alternatively, this circuit may be used to meet the high discharge needs of the high-discharge payload 34 during sunlight if mission operations demand such. The high rate discharge battery 36 is housed in the payload module 16 separately from the low rate discharge battery 22 in the bus circuit 14. The high rate discharge battery 36 is removably couplable to the battery charge management unit 24 of the bus circuit 14 such that the high rate discharge battery 36 may be charged by the bus circuit 14 during the sunlight power mode and managed by the battery charge management unit 24 during its use. For example, the battery charge management unit 24 may be configured to determine whether to send voltage to either the low rate discharge battery 22 or the high rate discharge battery 36, or both, during operation depending on the amount of voltage required by the corresponding battery 22, 36 and the remaining power in each battery.

The payload module 16 also includes a power distribution unit 38 and a voltage control unit 40 for the high rate discharge battery 36. The voltage control unit 40 and the power distribution unit 38 may be operable independently from the power distribution unit 28 and the voltage control unit 30 of the bus circuit 14.

Advantageously, the electrical power system 10 including the high rate discharge battery 36 arranged in the payload module 16 and removably couplable to the battery charge management unit 24 enables the payload module 16 to draw power from the bus circuit 14, as compared with drawing power directly from the solar array as in conventional systems. This enables modularity of the electrical power system 10 in that the payload module 16 may be integrated with existing bus circuits. Using the dual battery configuration is further advantageous in that the batteries may be optimally sized to accommodate the individual power requirements for different payloads, i.e. for the low-discharge payload 20 and the high-discharge payload 34.

Still another advantage of the electrical power system 10 is that the payload module 16 may include a payload module thermal management system 42, 44 that is independent from the spacecraft thermal management system 32 for the bus circuit 14. The payload module thermal management system 42, 44 may include at least one thermal radiator 42 and a heat sink 44 configured to store and reject the waste heat of the high rate discharge battery 36 over a full duration of the orbit for the spacecraft 12. The heat sink 44 may include any suitable thermal components for heat storage such as phase change materials. For example, paraffin-based phase change materials may be suitable. Advantageously, since the payload module 16 has a separate power module thermal management system and is sized for rejection over the duration of the orbit 42, 44, a smaller sized thermal radiator 42 and smaller thermal management system 42, 44 may be implemented in the payload module 16.

The payload module 16 may be a self-contained module that is connectable to the spacecraft 12 using any suitable connectors and electromechanical interfaces. For example, the payload module 16 may include a single housing that houses the electronics for the payload module 16. The electrical power system 10, 10' is modular in that the payload module 16 may be integrated in any suitable spacecraft 12.

Figure 2:
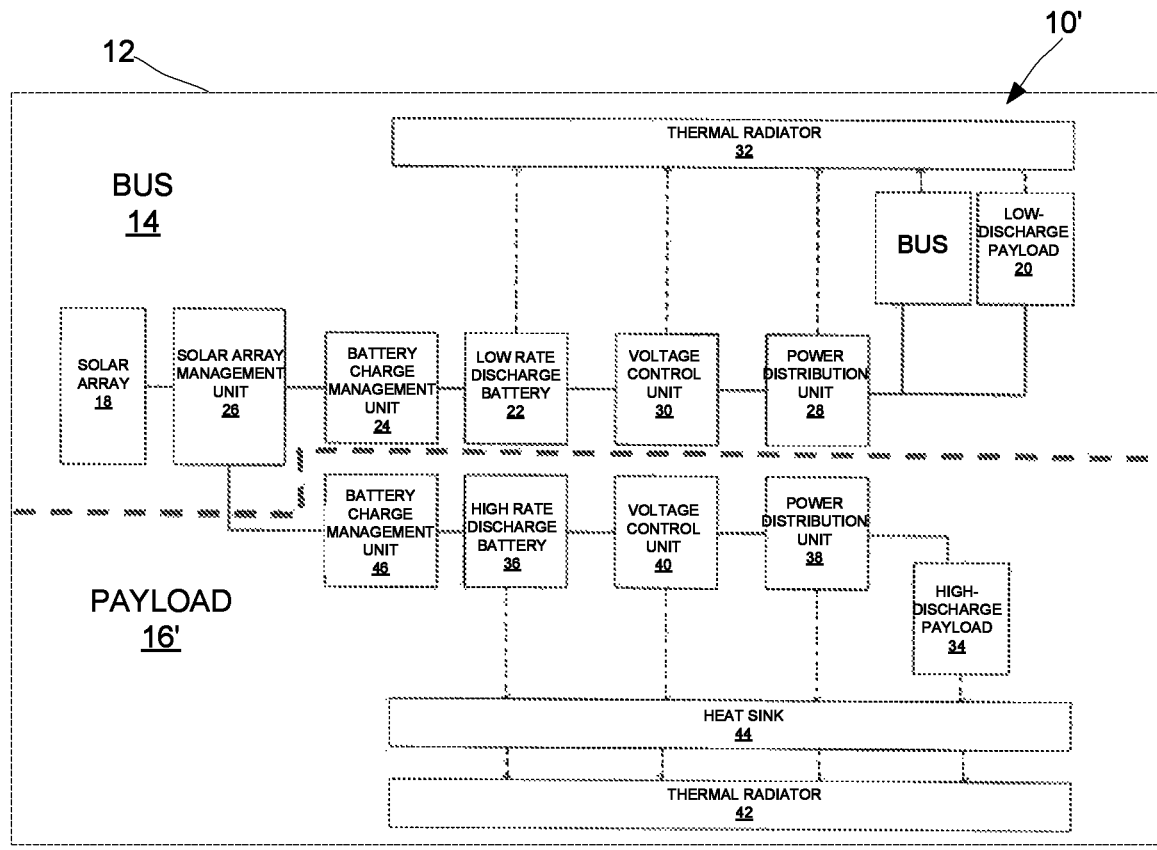
FIG. 2 shows an electrical power system for a spacecraft according to another exemplary embodiment of the present disclosure.

Referring now to FIG. 2, an electrical power system 10' for a spacecraft 12 is shown in which a secondary battery charge management unit 46 is arranged in the payload module 16'. The secondary battery charge management unit 46 is coupled to the high rate discharge battery 36 and removably couplable to the solar array management unit 26 for the solar array 18 of the spacecraft 12. The bus circuit 14 for the spacecraft 12 may include the low-discharge payload 20, the spacecraft thermal management unit 32, the power distribution unit 28, and the voltage control unit 30, as in the electrical power system 10 shown in FIG. 1 and as previously described. The payload module 16' may include the high-discharge payload 34, the power distribution unit 38, the voltage control unit 30, and the payload module thermal management unit 42, 44 as in the electrical power system 10 shown in FIG. 1 and as previously described.

Providing the secondary battery charge management unit 46 is advantageous in that the payload module 16' and the corresponding electronics are configured to manage the high rate discharge battery 36 without the bus circuit 14. Accordingly, the payload module 16' may be operable for parallel power testing with the bus circuit 14 and/or independent operation when the payload module 16' is decoupled from the bus circuit 14 of the spacecraft 12. Thus, the configuration shown in FIG. 2 may eliminate using physical interfaces or bus power emulators between the bus circuit 14 and the payload module 16'.

Figure 3:
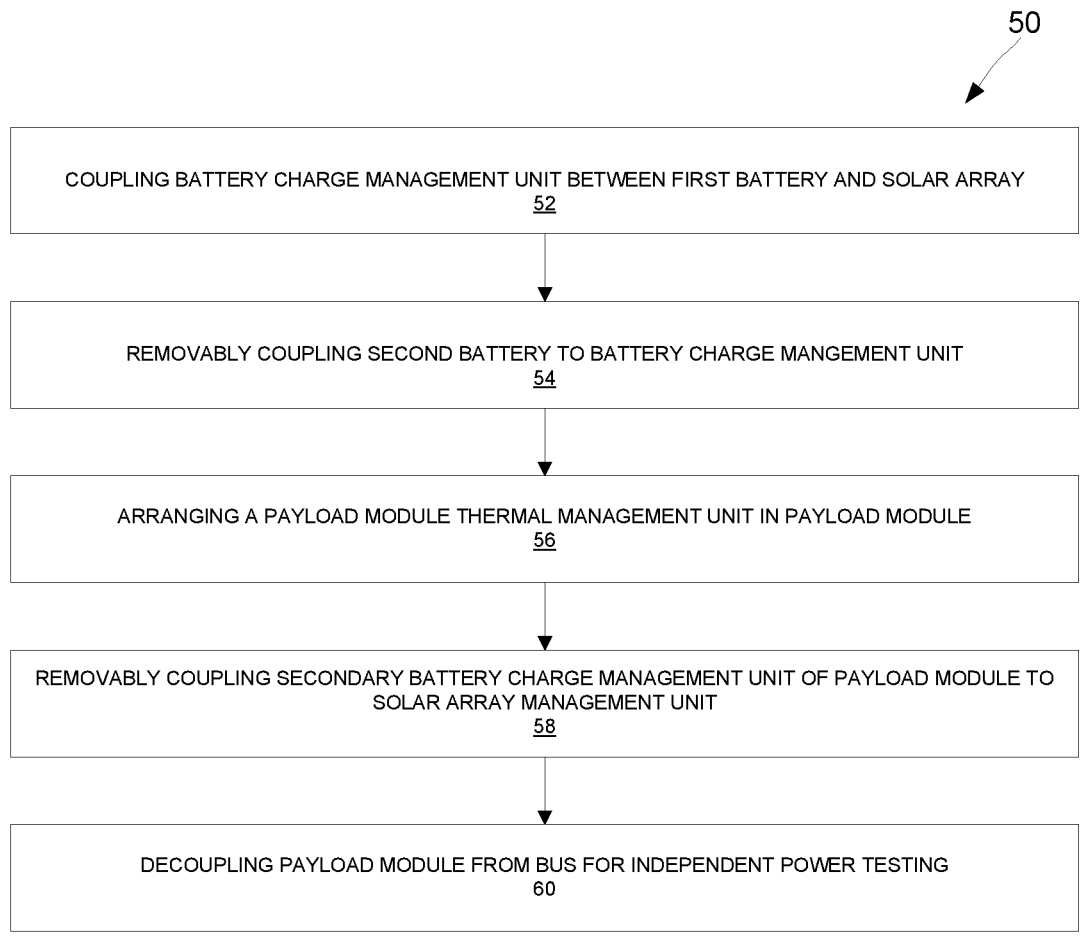
FIG. 3 shows a flowchart for a method of arranging an electrical power system for a spacecraft, such as the electrical power system of FIG. 1 or FIG. 2.

Referring now to FIG. 3, a flowchart showing a method 50 of arranging an electrical power system for a spacecraft, such as the electrical power systems 10, 10' of FIGS. 1 and 2, is shown. Step 52 of the method 50 includes coupling the battery charge management unit 24 between the low rate discharge battery 22 and the solar array 18 in the bus circuit 14. Step 54 of the method 50 includes removably coupling the high rate discharge battery 36 to the battery charge management unit 24. Step 56 of the method 50 includes arranging the payload module thermal management 42, 44 in the payload module 16. Step 58 of the method 50 may include removably coupling the secondary battery charge management unit 46 of the payload module 16' to the solar array management unit 26, as shown in FIG. 2. Step 60 of the method 50 may include decoupling the payload module 16' from the bus circuit 14 for parallel testing or independent power testing relative to power testing for the bus circuit 14.

Figure 4:
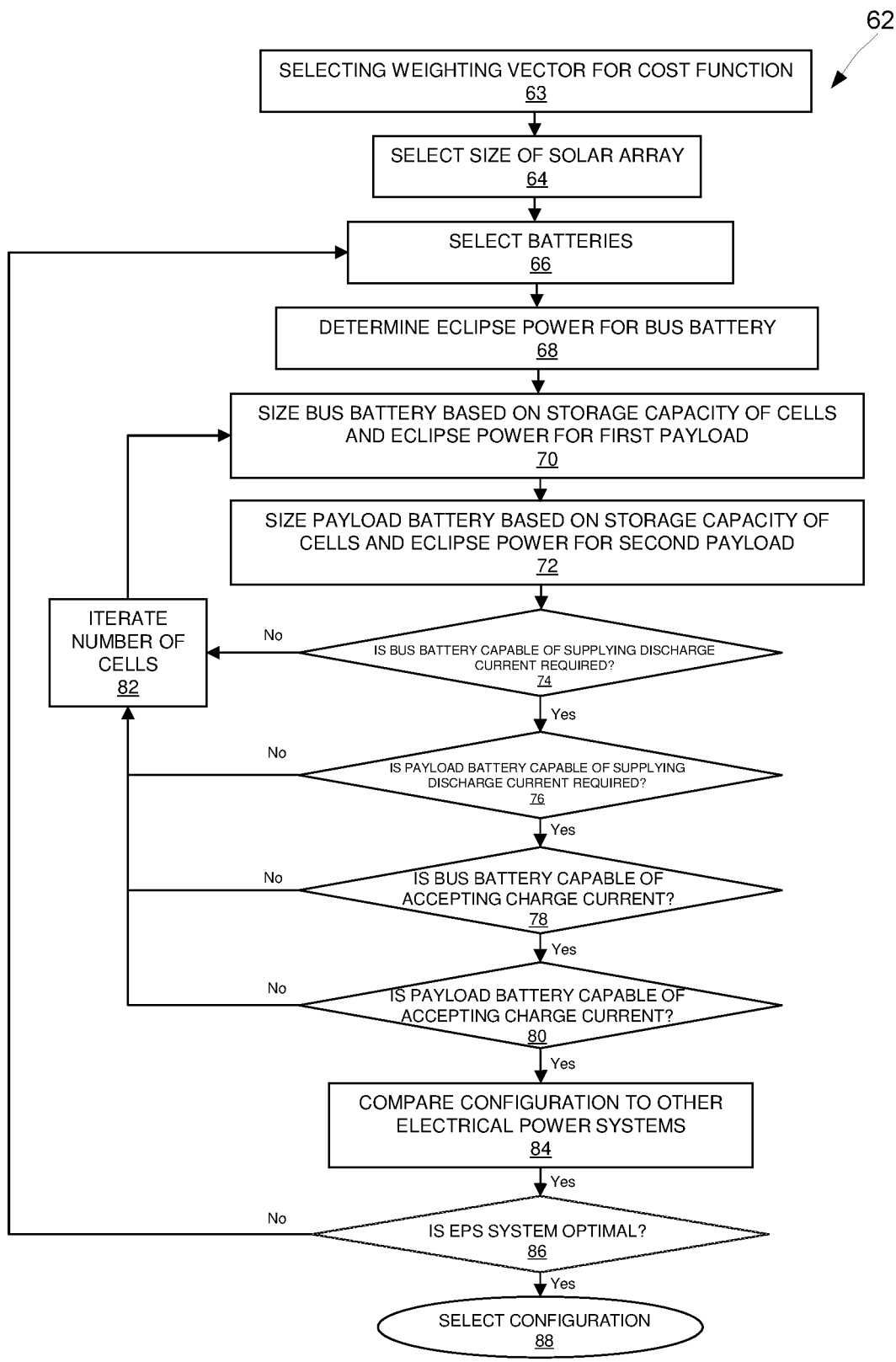
FIG. 4 shows a flowchart for a method of sizing the dual battery configuration in the method of FIG. 3.
Figure 5:
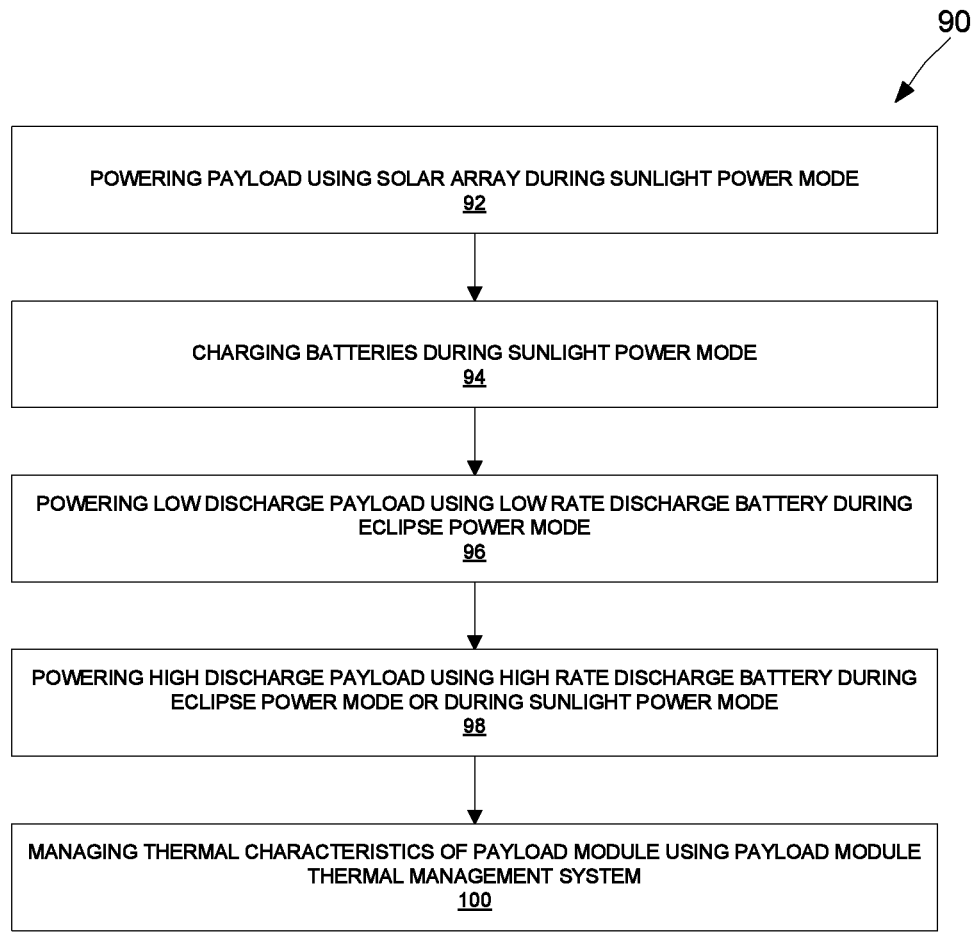
FIG. 5 shows a flowchart for a method of operating a spacecraft using an electrical power system, such as the electrical power system of FIG. 1 or FIG. 2.

Referring now to FIG. 4, a flowchart showing a method 62 of sizing the dual battery configuration 22, 36 in the method 50 of arranging the electrical power system 10, 10' for the spacecraft 12 is shown. At the outset, step 63 of the method 50 includes selecting a predetermined weighting vector to perform a cost function analysis for the electrical power system 10, 10'. Step 64 of the method 62 includes selecting the size of the power source for the spacecraft 12, such as the solar array 18. Determining the optimal size for the batteries 22, 36 may be performed automatically or manually. The solar array 18 may be sized to provide a full amount of power for both the low-discharge payload 20 and the high-discharge payload 34 during the sunlight power mode of the electrical power system 10, 10'. The size and amount of power will be dependent on mission requirements and application for the spacecraft 12. In exemplary applications, the solar array 18 may be configured for power amounts that are between 1000 and 3000 watts. The size and power $P_{SA}$ of the solar array 18 may be determined using equation (1):

$$P_{SA} = \int_{t=0}^{1\ REV} \frac{1}{OPS(t)} P_{LD}(t) dt \qquad \text{Equation (1)}$$

In equation (1), it is assumed that the energy is balanced in one orbit, during one revolution. OPS(t) represents the vehicle's operational impacts on the solar array 18 and $P_{LD}$ represents the total power load as a function of time over the orbit. In the spacecraft 12, the total power load $P_{LD}$ includes the power for the low-discharge payload 20 and the high-discharge payload 34. After the desired power $P_{SA}$ and size of the solar array 18 is determined, step 66 of the method 62 includes selecting battery cell types for each of the low rate discharge battery 22 and the high rate discharge battery 36. Selecting the battery cell type includes determining a useable energy storage for the battery cell using equation (2):

$$E_{cell} = DoD_Q(E_{cap}) \qquad \text{Equation (2):}$$

In equation (2), the useable energy storage $E_{cell}$ for a battery cell is determined based on the depth of discharge $DoD_Q$ of the battery and the energy storage capacity $E_{cap}$. Given that the battery must supply sufficient current to support the power required by the corresponding low-discharge payload 20 or the high-discharge payload 34, the current rating for the battery cell must be considered. The current rating for the battery cell is determined by equation (3):

$$C = \frac{i_{max}}{E_{cap}} \qquad \text{Equation (3)}$$

In equation (3), the current rating C for the battery cell is determined based on the ratio of the maximum current $i_{max}$ for the battery cell to the energy storage capacity $E_{cap}$ for the battery cell. After the battery cell types are chosen using equations (2) and (3), steps 70 and 72 of the method 62 include sizing each of the high rate discharge battery 36 and the low rate discharge battery 22. In first sizing a single battery, such as the low rate discharge battery 22 for the bus circuit 14, a battery pack is composed of a plurality of cells that are arranged in series and strings of cells that are arranged in parallel. Given that the low rate discharge battery 22 for the electrical power system 10, 10' may only be used during the sun eclipse, i.e. during the eclipse power mode of the electrical power system 10, 10' the number of cells in series may be configured to support the voltage for the bus circuit 14. The cells used to form the battery pack may have a predetermined voltage such that the number of cells is adjusted to achieve the predetermined voltage. The number of cells for the battery pack is determined by equation (4):

$$n = \frac{V_{bus}}{V_{cell}} \qquad \text{Equation (4)}$$

In equation (4), the number of cells n is determined based on the ratio of the voltage $V_{bus}$ of the bus circuit 14 to the cell voltage $V_{cell}$ for the selected battery pack cells. Given that the low rate discharge battery 22 is configured to have sufficient energy storage to support the load of the low-discharge payload equipment 20, the energy storage must also be determined. Determining the energy storage $E_s$ for the low rate discharge battery 22 may include using equation (5):

$$E_s = \int_{t=eclipse\ open}^{t=eclipse\ close} P_{LD}(t) dt \qquad \text{Equation (5):}$$

In equation (5), it is assumed that the low rate discharge battery 22 is discharged during the sun eclipse, e.g. during the eclipse power mode of the electrical power system 10, 10', and charged during the sunlight portion of the orbit for the spacecraft 12, e.g. during the sunlight power mode of the electrical power system 10, 10'. The energy storage $E_s$ for the low rate discharge battery 22 is thus determined by the total time dependent load $P_{LD}$ for the low-discharge payload 20 during the eclipse power mode. Sizing the battery pack for the low rate discharge battery 22 is then enabled by determining the number of cell strings m using equation (6):

$$m \geq \frac{E_s}{E_{cell}} \qquad \text{Equation (6)}$$

Determining that the selected battery pack configuration having a number of cell strings m is capable of supplying the maximum required current for the low-discharge payload 20 may include examining equation (7):

$$m \geq \frac{1}{C(E_s)}(i_{Ld}) \qquad \text{Equation (7)}$$

In equation (7), the determination of the number of cell strings m for the battery pack is confirmed based on the current rating C for the battery cells, the energy storage $E_s$ for the low rate discharge battery 22, and the maximum sustained current $i_{Ld}$ required by the total load of the low-discharge payload 20 during the eclipse. If equation (7) is false, then the number of cell strings m must be increased until equation (7) is true.

The principles for sizing the low rate discharge battery 22 may also be used to size the high rate discharge battery 36 of the dual battery electrical power system 10, 10'. In the method 62, step 72 includes sizing the high rate discharge battery 36 of the payload module 16 based on the minimum storage capacity of the cells for the high rate discharge battery 36 and the power required by the high-discharge payload 34 during the eclipse power mode. The battery pack sizing may be performed independently for each of the low rate discharge battery 22 and the high rate discharge battery 36, but is based on an amount of power of the solar array 18 being suballocated to the batteries 22, 36 during the independent use of each battery.

In sizing both batteries 22, 36, the required energy storage $E_{sbus}, E_{spyld}$ for the bus circuit 14 and the payload module 16, respectively, may be determined using equations (8) and (9), which are derived from equation (5):

$$E_{sbus} = \int_{t=eclipse\ open}^{t=eclipse\ close} P_{LDbus}(t) dt \qquad \text{Equation (8):}$$

$$E_{spyld} = \int_{t=eclipse\ open}^{t=eclipse\ close} P_{LDpyld}(t) dt \qquad \text{Equation (8):}$$

In equations (8) and (9), the energy storages $E_{sbus}, E_{spyld}$ for the bus circuit 14 and the payload module 16 are determined based on the time dependent load $P_{LDbus}(t)dt$, $P_{LDpyld}(t)dt$ during the eclipse for the low-discharge payload 20 of the bus circuit 14 and the high-discharge payload 34 of the payload module 16, respectively. Alternative formulations for the energy storage, such as for the high-discharge battery, $E_{spyld}$, are also contemplated as being part of this disclosure. The method 62 can be extended by changing the integration limits on equation (9) to adapt to the mission under consideration. The configuration of the battery pack for each of the low rate discharge battery 22 and the high rate discharge battery 36 is then determined using equations (10) and (11) which are derived from equation (6):

$$m \geq \frac{E_{sbus}}{E_{cellbus}} \qquad \text{Equation (10)}$$

$$y \geq \frac{E_{spyld}}{E_{cellpyld}} \qquad \text{Equation (11)}$$

The number of cells n in series for each of the low rate discharge battery 22 and the high rate discharge battery 36 may not be equal as the payload module 16 may operate at a different voltage as compared with the bus circuit 14, or the cells of the high rate discharge battery 36 for the payload module 16 may have a different voltage characteristic as compared with the low rate discharge battery 22.

After sizes and possible configurations are selected for each of the low rate discharge battery 22 and the high rate discharge battery 36, steps 74 and 76 of the method 62 include determining whether the batteries 22, 36 are capable of supplying the required discharge current for the low-discharge payload 20 and the high-discharge payload 34, given that the function of supplying current to the bus circuit 14 and the payload module 16 is suballocated to the batteries 22, 36 during the eclipse power mode. In exemplary embodiments, the high discharge functions of the payload module 16 may be suballocated only to the high rate discharge battery 36, such that the low rate discharge battery 22 may be configured to accommodate current drawn from the payload module 16 during the eclipse to function as an alternative power source for the thermal management system.

Step 74 includes determining whether the battery configuration selected for the low rate discharge battery 22 is capable of supporting the current $i_{Ldbus}$ drawn by the low-discharge payload 20 of the bus circuit 14 during the eclipse power mode using equation (12). Similarly, step 76 includes determining whether the battery configuration selected for the high rate discharge battery 36 is capable of providing current $i_{Ldpyld}$ for the high-discharge payload 34 of the payload module 16 using equation (13). In exemplary applications, the peak power for the high-discharge payload 34 may be between 6000 and 30,000 watts. Equations (12) and (13) are derived from equation (7):

$$m \geq \frac{1}{C_{bus}(E_{sbus})}(i_{Ldbus}) \qquad \text{Equation (12)}$$

$$y \geq \frac{1}{C_{pyld}(E_{spyld})}(i_{Ldpyld}) \qquad \text{Equation (13)}$$

Equations (12) and (13) include cell ratings $C_{bus}$, $C_{pyld}$ for the low rate discharge battery 22 of the bus circuit 14 and the high rate discharge battery 36 of the payload module 16, respectively, and the maximum sustained current draws $i_{Ldbus}$, $i_{Ldpyld}$ for the batteries 22, 36 of the bus circuit 14 and the payload module 16, respectively. If either equation (12) or (13) are false, then m or y must be increased until both equations are true. Accordingly, in the method 62, step 82 includes iterating the number of cells until both of the batteries 22, 36 are sized to provide the desired discharge current for the corresponding payload during the eclipse power mode, i.e. until both equations (12) and (13) are met.

The method 62 may further include determining whether the selected battery sizes for the low rate discharge battery 22 and the high rate discharge battery 36 satisfy the allowable charge rate for the batteries 22, 36 during the sunlight power mode. Steps 78 and 80 of the method 62 include determining whether the batteries 22, 36 are capable of accepting the charge current using equations (14) and (15):

$$\frac{E_{sbus}}{V_{bus}} \leq m i_{Cbus} \int_{t=\text{eclipse close}}^{t=\text{eclipse open}} O_{PSbus}(t)dt \qquad \text{Equation (14)}$$

$$\frac{E_{spyld}}{V_{pyld}} \leq y i_{Cpyld} \int_{t=\text{eclipse close}}^{t=\text{eclipse open}} O_{PSpyld}(t)dt \qquad \text{Equation (15)}$$

In equations (14) and (15), $V_{bus}$ and $V_{pyld}$ represent the operating voltages for the bus circuit 14 and the payload module 16, respectively, $i_{Cbus}$ and $i_{Cpyld}$ represent the maximum allowable charge current for the cells used in the batteries 22, 36 for the bus circuit 14 and the payload module 16, respectively, and $O_{PSbus}(t)$ and $OPS_{pyld}(t)$ represent the operation of the bus circuit 14 and the payload module 16 during the sunlight power mode, respectively. OPS(t) is a function expressing the scaled usage of the payload or bus. For example, the time-dependent value of OPS is one if the payload is on at 100% and zero if the payload is completely off and drawing no power. OPS(t) is unitless but integrating the function over time results in the total on time, which, when multiplied by the current, represents the total charge. If the equations (14) and (15) are not true, then m or y must be increased until both equations are true. In the method 62, step 82 includes iterating the number of cells until the batteries are sized to accept the required charge current, i.e. until both equations (14) and (15) are met.

When the selected sizes and configurations for the low rate discharge battery 22 and the high rate discharge battery 36 are determined to meet the power requirements for the particular mission or application of the spacecraft 12, step 84 of the method 62 may include comparing the configuration of the electrical power system 10, 10' to other electrical power systems and step 86 may include determining whether the electrical power system 10, 10' is optimal. Optimization of the electrical power system 10, 10' may be determined using a cost function of the form equation (16):

$$A_{cell} = \begin{bmatrix} \frac{mass}{cell}(1) & \frac{volume}{cell}(1) & \frac{cost}{cell}(1) \\ \frac{mass}{cell}(2) & \frac{volume}{cell}(2) & \frac{cost}{cell}(2) \end{bmatrix} \qquad \text{Equation (16)}$$

In equation (16), $A_{cell}$ is defined as a matrix representing attributes of each type of proposed cell for the batteries 22, 36. The example shown considers three attributes of the cells types, but it could be expanded to any arbitrary number of attributes, n, based on the desired parameters for the system. Determining optimization of the electrical power system 10, 10' may include determining the 'system cost' per cell $C_{cell}$ based on the predetermined weighting vector $\vec{w}$ selected in step 63 of the method using equation (17):

$$C_{cell} = A_{cell}(\vec{w}) =$$ Equation (17)

$$\begin{bmatrix} \frac{mass}{cell}(1)*w(1) & \frac{volume}{cell}(1)*w(2) & \frac{cost}{cell}(1)*w(3) \\ \frac{mass}{cell}(2)*w(1) & \frac{volume}{cell}(2)*w(2) & \frac{cost}{cell}(2)*w(3) \end{bmatrix}$$

The 'system cost' for the electrical power system 10, 10' may be evaluated using equation (18) which is used to scale by the size of each battery $\vec{b}_{size}$:

$$\vec{b}_{size} = [n*m \ x*y]$$ Equation (18):

The total system cost $C_{sys}$ is then evaluated using equation (19):

$$C_{sys} = \vec{b}_{size} * \vec{C}_{cell} = [n*m \ x*y]\begin{bmatrix} C_{cell}(1) \\ C_{cell}(2) \end{bmatrix}$$ Equation (19)

Optimizing the dual battery configuration for the electrical power system 10, 10' is performed by evaluating any available cell choices that satisfy equations (10) through (15). The minimum value of the total system cost $C_{sys}$ represents an optimal configuration. Accordingly, if the electrical power system 10, 10' is determined to not be optimal, step 66 of the method 62, i.e. selecting the battery, and the subsequent steps are repeated until the optimal battery configuration is established. If the electrical power system 10, 10' is determined to be optimal, step 88 of the method 62 includes implementing the battery configuration in the spacecraft 12.

The method 62 is advantageous in that the electrical power system 10, 10' is optimized to meet the demands of a particular mission for the spacecraft 12. The method enables selecting components to reduce system-level failure. Reliability of the spacecraft 12 is also ensured since reliability of the spacecraft 12 is based on the number of parts, such as battery cells. The method 62 may include ensuring the reliability of the electrical power system by one of selecting a number of components to reduce the number of components susceptible to failure, or selecting the number of components to increase the number of components susceptible to failure whereby the reliability of the electrical power system is maintained if one of the number of components is in a failure mode.

For example, fewer battery cells may be selected to ensure less failure during operation of the spacecraft 12, e.g. due to fewer components, or more battery cells may be selected to ensure operation of the spacecraft 12 if one or more of the cells fails, e.g. due to more components, the failure of one or more components will not provide a significant impact in operation. The principles described herein may also be implemented with any of the disclosure of U.S. Pat. No. 9,368,983 which discloses an autonomous regulation method for a battery, and the entirety of which is hereby incorporated herein by reference. The method described herein may be implemented with the method disclosed in U.S. Pat. No. 9,368,983 to form a robust power subsystem that is able to support deep space travel.

After the battery configuration is determined and optimized using the method 62, the spacecraft 12 including the electrical power system 10, 10' may be launched into orbit and configured for operation. FIG. 4 shows a flowchart for a method 90 of operating the spacecraft 12. Step 92 of the method 90 includes powering the low-discharge payload 20 and the high-discharge payload 34 of the payload module 16 carried by the spacecraft 12 using the solar array 18 during a sunlight power mode. Step 94 of the method 90 includes charging the low rate discharge battery 22 of the spacecraft 12 and the high rate discharge battery 36 of the payload module during the sunlight power mode using the battery charge management unit 24 of the spacecraft 12.

Step 96 of the method 90 includes powering the low-discharge payload 20 using the low rate discharge battery 22 during the eclipse power mode and step 98 of the method 90 includes powering the high-discharge payload 34 using the high rate discharge battery 36 during the eclipse power mode or during a sunlight mode. Alternatively, it is possible to power the high-discharge payload 34 during sun power mode by using the high rate discharge battery 36 in order to optimize the payload's ability to meet the mission's operational requirements. Step 100 of the method 90 includes managing thermal characteristics of the payload module 16 using the payload module thermal management system 42, 44 of the payload module 16 that is coupled to the high rate discharge battery 36 and separate from a spacecraft thermal management system 32 for the bus circuit 14.

The functional units described in this specification may be a module or more than one module which may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like. The module may also be implemented in software for execution by various types of processors. An identified module of executable code may, for instance, comprise one or more physical or logical blocks of computer instructions, which may, for instance, be organized as an object, procedure, or function. The executables of an identified module need not be physically located together, but may comprise disparate instructions stored in different locations which, when joined logically together, comprise the module and achieve the stated purpose for the module.

A module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Although the disclosure shows and describes certain preferred embodiment or embodiments, it is obvious that equivalent alterations and modifications will occur to others skilled in the art upon the reading and understanding of this specification and the annexed drawings. In particular regard to the various functions performed by the above described elements (external components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the disclosure. In addition, while a particular feature of the disclosure may have been described above with respect to only one or more of several illustrated embodiments, such feature may be combined with one or more other features of the other embodiments, as may be desired and advantageous for any given or particular application.

What is claimed is:

1. An electrical power system for a spacecraft, the electrical power system comprising:
a bus circuit including a first payload, a solar array, a first battery, and a battery charge management unit coupled between the first battery and the solar array; and
a payload module that is carried by the spacecraft, the payload module including a second payload and a second battery that is electrically coupled to the battery charge management unit of the bus circuit;
wherein the electrical power system has a sunlight power mode in which the solar array is operable to power the first payload and the second payload while the first battery and the second battery are charged; and an eclipse power mode in which the first battery is operable to power the first payload, and in which the second battery is operable to power the second payload independently from the bus circuit; and
wherein, during the sunlight power mode, the battery charge management unit controls charging of the first battery and the second battery by the solar array.

2. The electrical power system according to claim 1, wherein the second battery is operable to supply current to the second payload when in the sunlight power mode.

3. The electrical power system according to claim 1, wherein the second battery is configured to discharge current at a higher rate as compared with the first battery.

4. The electrical power system according to claim 1, wherein the payload module includes a payload module thermal management system that is independent from a spacecraft thermal management system for the bus circuit.

5. The electrical power system according to claim 4, wherein the payload module thermal management system includes a heat sink.

6. The electrical power system according to claim 5, wherein the heat sink includes a phase change material.

7. The electrical power system according to claim 1, wherein the bus includes a solar array management unit coupled between the solar array and the battery charge management unit.

8. The electrical power system according to claim 7, wherein the payload module includes a secondary battery charge management unit that is removably couplable to the solar array management unit.

9. The electrical power system according to claim 8, wherein the payload module is operable for power testing independently from the bus circuit when the payload module is uncoupled from the bus circuit.

10. The electrical power system according to claim 1, wherein each of the first battery and the second battery are coupled to a corresponding voltage control unit and a corresponding power distribution unit.

11. A method of arranging an electrical power system for a spacecraft, the method comprising:
coupling a battery charge management unit between a first battery and a solar array in a bus circuit that includes a first payload; and
electrically coupling a second battery of a payload module to the battery charge management unit, the payload module being configured to be carried by the spacecraft and including a second payload having a higher current discharge rate as compared with the first payload, the payload module being a self-contained module that is connectable to the spacecraft that includes the bus circuit.

12. The method according to claim 11 further comprising arranging a payload module thermal management unit in the payload module independently from a spacecraft thermal management unit of the bus.

13. The method according to claim 11 further comprising:
coupling a solar array management unit between the solar array and the battery charge management unit in the bus circuit; and
removably coupling a secondary battery charge management unit of the payload module to the solar array management unit.

14. The method according to claim 13 further comprising:
decoupling the payload module from the bus circuit; and
power testing the payload module and the bus circuit independently relative to each other.

15. The method according to claim 11 further comprising selecting a size of the solar array to power the first payload and the second payload during a sunlight power mode of the electrical power system.

16. The method according to claim 15 further comprising:
sizing the first battery to be charged during the sunlight power mode and power the first payload during an eclipse power mode;
sizing the second battery to be charged during the sunlight power mode and power the second payload during the eclipse power mode or during the sunlight power mode;
selecting a battery cell type for each of the first battery and the second battery; and
sizing the first battery and the second battery based on a minimum storage capacity of the battery cell type for each of the first battery and the second battery.

17. The method according to claim 16 further comprising at least one of:
resizing the first battery until the first battery is configured to be charged during the sunlight power mode and power the first payload during the eclipse power mode; or
resizing the second battery until the second battery is configured to be charged during the sunlight power mode and power the second payload during the eclipse power mode or during the sunlight power mode.

18. The method according to claim 11 further comprising ensuring reliability of the electrical power system by one of:
selecting a number of components to reduce the number of components susceptible to failure; or
selecting the number of components to increase the number of components susceptible to failure whereby the reliability of the electrical power system is maintained if one of the number of components is in a failure mode.

19. A method of operating a spacecraft using an electrical power system, the method comprising:
powering a low-discharge payload of the spacecraft and a high-discharge payload of a payload module carried by the spacecraft, the payload module being a self-contained module that is connectable to the spacecraft, using a solar array during a sunlight power mode;
charging a low rate discharge battery of the spacecraft and a high rate discharge battery of the payload module during the sunlight power mode using a battery charge management unit for the spacecraft;
powering the low-discharge payload using the low rate discharge battery during an eclipse power mode;

powering the high-discharge payload using the high rate discharge battery during the eclipse power mode or in sunlight; and managing thermal characteristics of the payload module using a payload module thermal management system of the payload module that is coupled to the high rate discharge battery and separate from a spacecraft thermal management system for the spacecraft.

20. The electrical power system according to claim 1, wherein the battery charge management unit is configured to allow the payload module to draw power from the bus circuit.

21. The electrical power system according to claim 1, wherein the payload module is a self-contained module that is connectable to a spacecraft that includes the bus circuit.

* * * * *